United States Patent
Woods et al.

(10) Patent No.: US 11,084,189 B2
(45) Date of Patent: Aug. 10, 2021

(54) MOLDING TOOLS WITH BIOMIMETIC CONFORMAL VENTING PASSAGEWAYS AND METHODS FOR FORMING BIOMIMETIC CONFORMAL VENTING PASSAGEWAYS IN MOLDING TOOLS

(71) Applicant: Ford Motor Company, Dearborn, MI (US)

(72) Inventors: Derren Woods, Plymouth, MI (US); Robert D. Bedard, Allen Park, MI (US)

(73) Assignee: Ford Motor Company, Dearborn, MI (US)

( * ) Notice: Subject to any disclaimer, the term of this patent is extended or adjusted under 35 U.S.C. 154(b) by 274 days.

(21) Appl. No.: 16/378,936

(22) Filed: Apr. 9, 2019

(65) Prior Publication Data
US 2020/0324441 A1 Oct. 15, 2020

(51) Int. Cl.
*B29C 33/38* (2006.01)
*B33Y 50/02* (2015.01)
*B29C 64/393* (2017.01)
*B29L 31/00* (2006.01)
*B33Y 10/00* (2015.01)

(52) U.S. Cl.
CPC ........ *B29C 33/3835* (2013.01); *B29C 64/393* (2017.08); *B33Y 50/02* (2014.12); *B29L 2031/757* (2013.01); *B33Y 10/00* (2014.12)

(58) Field of Classification Search
CPC .................................................. B29C 33/3835
See application file for complete search history.

(56) References Cited

U.S. PATENT DOCUMENTS

| 5,587,183 | A | 12/1996 | Clark et al. |
| 6,827,569 | B2 | 12/2004 | Wieder |
| 7,524,175 | B2 | 4/2009 | Henrotte et al. |

(Continued)

FOREIGN PATENT DOCUMENTS

WO 2000009307 2/2000

OTHER PUBLICATIONS

Brøtan, V. et al., Additive Manufacturing for Enhanced Performance of Molds, 6th CLF—6th CIRP Conference on Learning Factories, Procedia CIRP, vol. 54, pp. 186-190, Elsevier B.V., 2016.

(Continued)

*Primary Examiner* — Larry W Thrower
(74) *Attorney, Agent, or Firm* — Burris Law, PLLC (57) ABSTRACT

A method of forming a molding tool includes performing a computer aided engineering (CAE) analysis on a molding tool design. The CAE analysis predicts flow of injection molded material and a location of gas entrapment within a molding recess of the molding tool design. At least one venting design constraint is applied to the molding tool design as a function of the gas entrapment location. Also, a biomimetic shaped passageway for venting gas away from the gas entrapment location is selected from a plurality of biomimetic shaped passageways. A computational fluid dynamic (CFD) CAE analysis of the molding tool design with the selected biomimetic shaped passageway is performed and modifications of the selected biomimetic shaped passageway are CFD CAE analyzed until a final biomimetic shaped passageway is determined and a molding tool with the final biomimetic shaped passageway is formed.

20 Claims, 4 Drawing Sheets

(56) References Cited

U.S. PATENT DOCUMENTS

2018/0250860 A1    9/2018    Killoran et al.

OTHER PUBLICATIONS

Milacron Holdings Corp., Milacron's DME Product Brand Announces Partnership with 3D Additive Leader Linear AMS to Provide Revolutionary Conformal Cooling Solutions Under its New TruCool Product Line, press release, Cincinnati, OH, Mar. 14, 2017.

Naitove, M.H., Molding 2017: News in 3D Printed Molds & Conformal Cooling, blog post May 4, 2017.

MOLDING TOOLS WITH BIOMIMETIC CONFORMAL VENTING PASSAGEWAYS AND METHODS FOR FORMING BIOMIMETIC CONFORMAL VENTING PASSAGEWAYS IN MOLDING TOOLS

FIELD

The present disclosure relates to molding tools, and in particular, to molding tools with venting passageways and methods for forming molding tools with venting passageways.

BACKGROUND

The statements in this section merely provide background information related to the present disclosure and may not constitute prior art.

Injection molding of parts typically includes management of gas resulting during the injection molding process. Particularly, the presence of air within a mold cavity and liquid plastic resin vaporizing into gas within the mold cavity can create dimensional and appearance issues in injection molded parts. Accordingly, some molding tools are designed to provide a vent from an interior to an exterior of the molding tool. Such venting includes small clearances or gaps at the interface between two or more solid interfaces of the molding tools, for example interfaces between a core and a cavity, a core and an ejector pin, a core and a lifter/slide, and the like.

The present disclosure addresses the issues of venting gas during injection molding of parts among other issues related to injection molding of parts.

SUMMARY

In one form of the present disclosure, a method of forming a vent passageway in a molding tool includes performing a computer aided engineering (CAE) analysis on a molding tool design for a molding tool and applying at least one venting design constraint to the molding tool design. The at least one venting design constraint is a function of at least one gas entrapment location (i.e., a location of gas entrapment) within a molding recess of the molding tool design. A biomimetic shaped passageway is selected from a plurality of biomimetic shaped passageways and a computational fluid dynamic (CFD) CAE analysis of the molding tool design with the selected biomimetic shaped passageway positioned at the at least one gas entrapment location is performed. The CFD CAE analysis predicts flow of gas from the at least one gas entrapment location through the selected biomimetic shaped passageway. After the CFD CAE analysis, the molding tool with the selected biomimetic shaped passageway is formed (manufactured). In some aspects of the present disclosure, the CAE analysis predicts flow of injection molded material within the molding tool design during injection molding of the part. Also, in some respects the CAE analysis predicts the at least one gas entrapment location in the molding recess.

In some aspects of the present disclosure, the method includes determining at least one element of the molding tool requiring venting. Non-limiting examples of the at least one element include a core/cavity parting line, a slide, a lifter, and a pin. In other aspects of the present disclosure the at least one venting design constraint includes at least one of a minimum vent diameter, a maximum vent diameter, a minimum vent length, a maximum vent length, and a vent surface profile. In still other aspects of the present disclosure, the prediction of the flow of injection molded material and the at least one gas entrapment location is a function of a molding resin used to injection mold the part, a material used to form the molding tool, and a gate/runner strategy for the molding tool. In such aspects, the CAE analysis predicts at least one location for a vent to be positioned in the molding tool.

In some aspects of the present disclosure, the selected biomimetic shaped passageway comprises at least one of a hexagonal shaped vent network, an octagonal shaped vent network, a conical shaped vent network, a lattice shaped vent network, and/or a vein shaped vent network. In other aspects of the present disclosure the method includes modifying the selected biomimetic shaped passageway and performing another CFD CAE analysis of the molding tool design with the modified biomimetic shaped passageway and reviewing the prediction of gas flow from the at least one gas entrapment location through the modified biomimetic shaped passageway. In such aspects, the method can include performing a plurality of modifications to the selected biomimetic shaped passageway and performing a CFD CAE analysis of the molding tool design for each modified biomimetic shaped passageway until a final molding tool design is determined or obtained.

In some aspects of the present disclosure the molding tool with the selected biomimetic shaped passageway is formed by additive manufacturing (e.g., 3D printing). Also, at least one part is injection molded in the molding tool. In such aspects, the method includes correlating the CFD CAE analysis which predicts the flow of gas from the at least one gas entrapment location with a surface appearance of the injection molded part and/or a dimension of the injection molded part. It should be understood that the selected biomimetic shaped passageway is in fluid communication with the molding recess via a plurality of openings and in some aspects the plurality of openings has an average diameter between 0.003 inches and 0.005 inches.

In another form of the present disclosure, a method of forming a conformal vent passageway in a molding tool includes providing a design of a part to be injection molded using a molding tool. At least one element of the molding tool requiring venting during injection molding of the part is determined and a CAE analysis is performed on a molding tool design of the molding tool. The CAE analysis predicts flow of injection molded material within the molding tool design. In some aspects the CAE analysis predicts at least one gas entrapment location within a molding recess of the molding tool design. At least one venting design constraint is applied to the molding tool design as a function of the at least one gas entrapment location and a plurality of biomimetic shaped passageways for venting gas from the at least one gas entrapment location are analyzed. At least one of the biomimetic shaped passageways is selected and a CFD CAE analysis of the molding tool design with the selected biomimetic shaped passageway is performed. The CFD CAE analysis predicts flow of gas from the at least one gas entrapment location through the selected biomimetic shaped passageway. In some aspects modifications of the selected biomimetic shaped passageway and additional CFD CAE analyses are performed until a final biomimetic shaped vent is determined. After the final biomimetic shaped vent is determined, a molding tool with the final biomimetic shaped passageway is formed.

In some aspects of the present disclosure, the at least one gas entrapment location is proximate to at least one of a core/cavity parting line, a slide, a lifter, and a pin. Also, the selected biomimetic shaped passageway is at least one of a hexagonal shaped vent network, an octagonal shaped vent network, a conical shaped vent network, a lattice shaped vent network, and/or a vein shaped vent network.

In still another form of the present disclosure, a method of forming a conformal vent passageway in a molding tool includes the following steps:

a) providing a design of a part to be injection molded using a molding tool;

b) determining at least one element of the molding tool requiring venting during injection molding of the part;

c) performing a CAE analysis on a molding tool design of the molding tool, the CAE analysis predicting flow of injection molded material within the molding tool design and at least one gas entrapment location within a molding recess of the molding tool design during injection molding of the part;

d) analyzing a plurality of biomimetic shaped passageways for venting gas from the at least one gas entrapment location;

e) selecting a biomimetic shaped passageway from the plurality of biomimetic shaped passageways;

f) performing a CFD CAE analysis of the molding tool design with the selected biomimetic shaped passageway, the CFD CAE analysis predicting flow of gas from the at least one gas entrapment location through the selected biomimetic shaped passageway; and g) reviewing the CFD CAE analysis and modifying the selected biomimetic shaped passageway. Steps f) and g) are repeated until a final molding tool design is provided and the final molding tool design is used to additive manufacture at least a portion of the molding tool.

In some aspects of the present disclosure, a part is injection molded in the molding tool and the CFD CAE analyses are correlated with a surface appearance of the injection molded part and/or a dimension of the injection molded part.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
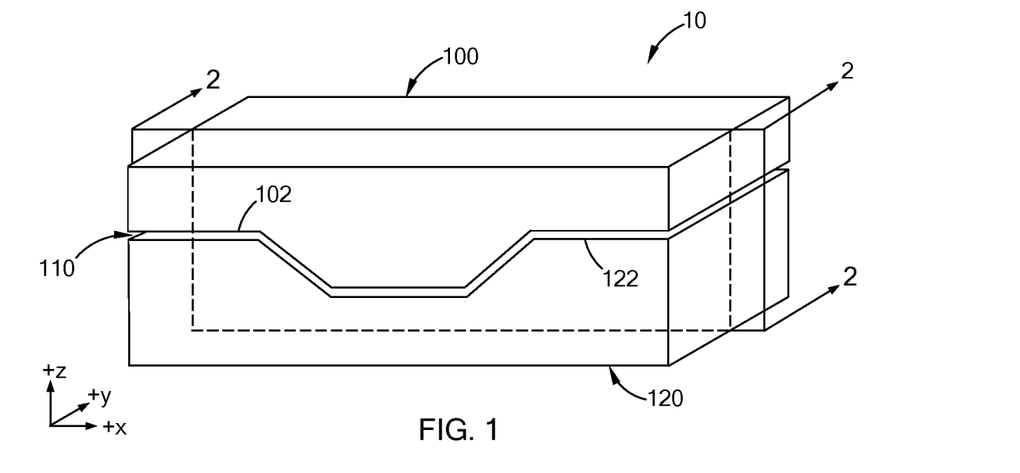
FIG. 1 is a pair of molding tools for injection molding a part.

Referring now to FIG. 1, a perspective view of molding tooling 10 for injection molding a part is schematically depicted. The molding tooling 10 includes a first mold component 100 (also known as a mold core) and a second mold component 120 (also known as a mold cavity). The first mold component 100 includes a first molding surface 102 and the second mold component 120 includes a second molding surface 122. An injection molded part is formed between the first molding surface 102 and the second molding surface 122 as explained in greater detail below.

Figure 2:
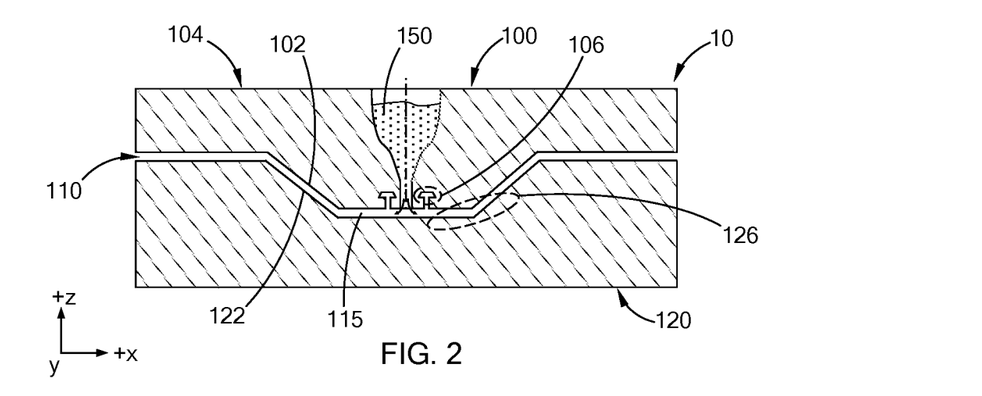
FIG. 2 is a cross-section of the pair of molding tools in FIG. 1 with two locations of gas entrapment.
Figure 3:
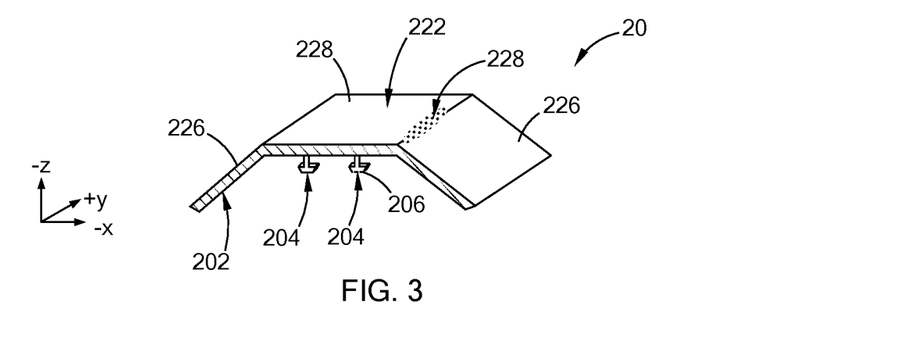
FIG. 3 is an injection molded part formed within the pair of injection molding tools in FIG. 1.

Referring now to FIGS. 2 and 3, a cross section of section 2-2 in FIG. 1 is schematically depicted in FIG. 2 and an injection molded part 20 formed between the first mold component 100 and the second mold component 120 is schematically depicted in FIG. 3. As shown in FIG. 2, a molding recess 115 through which molding material flows is formed between the first molding surface 102 and the second molding surface 122 such that a liquid 150 (e.g., liquid polymer, liquid metal, etc.) flows between the first molding surface 102 and the second molding surface 122, solidifies, and forms the injection molded part 20. It should be understood that the injection molded part 20 has a shape conforming to the first molding surface 102 and the second molding surface 122. That is, the liquid 150 flows into the mold cavity 115 and conforms to the first molding surface 102 and the second molding surface 122 before and/or during solidification. Accordingly, the part 20 includes a first surface 202 that conforms to or mirrors the first molding surface 102 and a second surface 222 that conforms to or mirrors the second molding surface 122. In this manner injection molded parts with desired dimensions, shapes, appearance/aesthetics, etc., are formed using molding tooling.

As schematically depicted in FIG. 3, the part 20 includes a central panel 224 extending between a pair of side panels 226. In some aspects of the present disclosure, the pair of side panels 226 extend from the central panel 224 at a non-zero angle that is provided by the molding recess 115 between the first molding surface 102 and the second molding surface 122. In addition to the panels 224, 226, the part 20 includes a pair of legs 204 extending from the second surface 202, and the pair of legs 204 conform to a pair of leg cavity portions 104 in the first molding surface 102 shown in FIG. 2. It should be understood that molding tools according to the teachings of the present disclosure form other shapes and features than those depicted in the drawings.

Still referring to FIG. 3, the result of gas entrapment during injection molding of the part 20 is schematically depicted. That is, gas entrapment within the mold cavity 150 results in at least one of the panels 224, 226 and/or at least one of legs 204 not being completely formed and/or having a rough surface portion. Particularly, one of the legs 204 is schematically depicted as not being completely formed at 206 and the central panel 224 and one of the side panels 226 is schematically depicted with a rough surface portion 228. The unformed portion 206 of the leg 204 is the result of gas entrapment in the mold cavity 115 at the circled region 106 and the rough surface portion 228 is the result of gas entrapment in the mold cavity 115 at circled region 126.

In some aspects of the present disclosure, conformal venting, e.g., one or more biomimetic conformal venting passageways, is included within the first mold component 100 and/or the second mold component 120. That is, in order to reduce the gas entrapment within the mold cavity 150, biomimetic conformal venting passageways that vent gas formed within the molding recess 115 are included in the molding tooling as discussed below.

Figure 4:
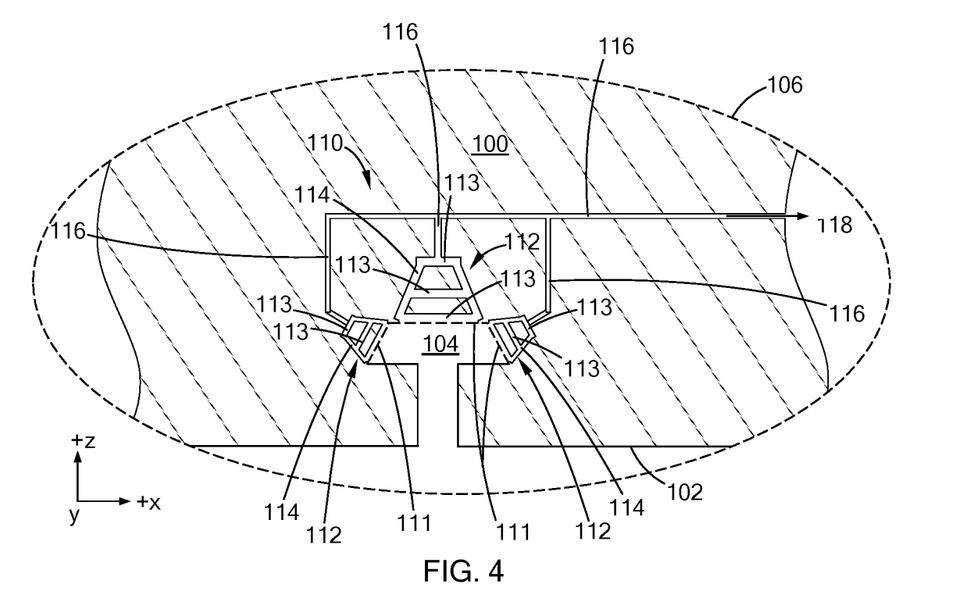
FIG. 4 is a biomimetic conformal venting passageway for one location of gas entrapment shown in FIG. 2 according to the teachings of the present disclosure.
Figure 5:
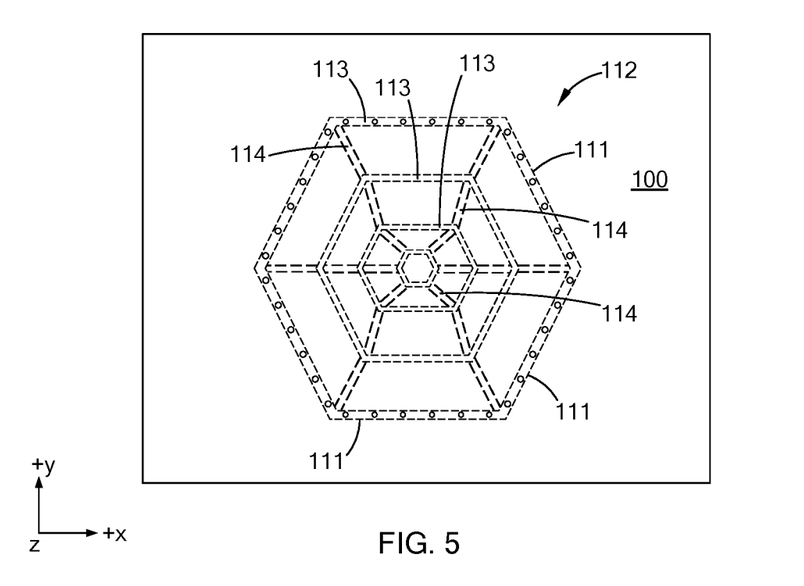
FIG. 5 is a biomimetic conformal venting passageway for another location of gas entrapment shown in FIG. 2 according to the teachings of the present disclosure.

Referring now to FIGS. 4 and 5, a biomimetic conformal venting passageway 110 for venting gas entrapped during the injection molding of the part 20 is schematically depicted. Particularly, FIG. 4 is an enlarged view of the circled region 106 in FIG. 2 and FIG. 5 is a planar view of the biomimetic conformal venting passageway 110 when viewed in from the +z direction shown in FIG. 4. The biomimetic conformal venting passageway 110 conforms with the surfaces (not labeled) of the leg cavity portions 104 within the first molding surface 102 and is in fluid communication with the mold cavity 150 via a plurality of openings or apertures 111. The biomimetic conformal venting passageway 110 includes one or more sub-venting passageways 112 that are formed from a plurality of polygonal shaped rings 113 fluidly connected to each other via web passageways 114. The one or more sub-venting passageways 112 are in fluid communication with an exterior 118 of the first molding component 100 via one or more main vent branches 116. Gas within the molding recess 115 is vented to an exterior 118 of the first mold component 100 during injection molding of the part 20. Particularly, during injection of the liquid 150 into the molding recess 115, air within the molding recess 115 at the beginning of the injection molding process and/or gas resulting from the vaporization of the liquid 150 during the injection molding process flows from within the molding recess 115 through the plurality of apertures 111, through the plurality of polygonal shaped rings 113, through the web passageways 114, and through at least one of the main vent branches 116 to the exterior 118 of the first mold component 120. It should be understood that the biomimetic conformal venting passageway 110, and other biomimetic conformal venting passageways disclosed herein, reduce and/or eliminate the unfilled portion 206 such that a desired leg, protrusion, etc., is provided.

Figure 6:
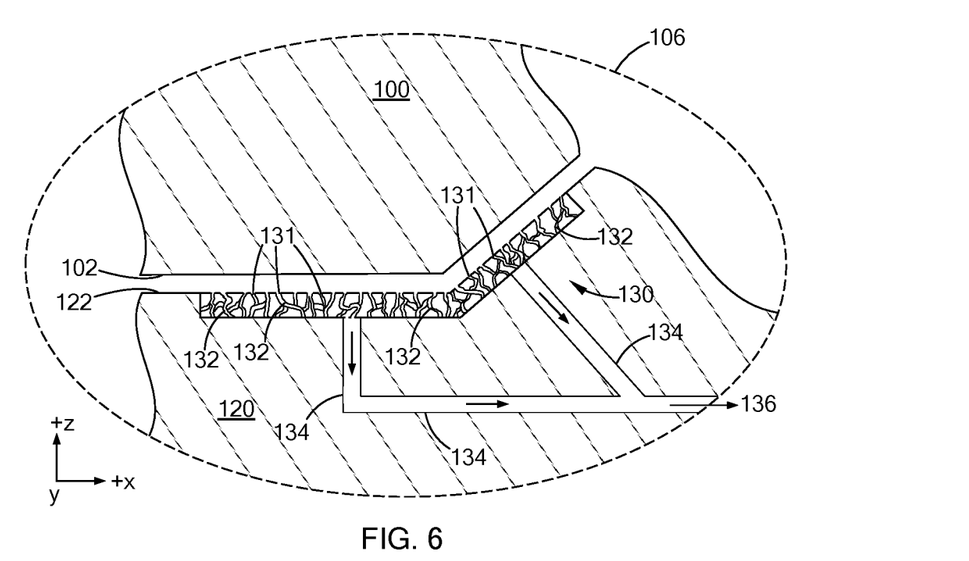
FIG. 6 is a top view of the biomimetic conformal venting passageway in FIG. 5 according to the teachings of the present disclosure.

Referring now to FIG. 6, another biomimetic conformal venting passageway 130 for venting gas entrapped during the injection molding of the part 20 is schematically depicted. Particularly, FIG. 6 is an enlarged view of circled region 126 in FIG. 2. The biomimetic conformal venting passageway 130 conforms with the second molding surface 122 and is in fluid communication with the mold cavity 150 via a plurality of openings or apertures 131. It should be understood that the plurality of openings or apertures 131 are configured to allow gas to pass or flow from the mold cavity 115 to the biomimetic conformal venting passageway 130, but not allow injection molding liquid material to flow from the mold cavity 115 to the biomimetic conformal venting passageway 130.

The biomimetic conformal venting passageway 130 comprises a plurality of passage ways 132 between the second molding surface 122 and a main vent branch 134 such that gas within the molding recess 115 is vented to an exterior 136 of the mold during injection molding of the part 20. Particularly, during injection of the liquid 150 into the molding recess 115, air within the molding recess 115 at the beginning of the injection molding process and/or gas resulting from the vaporization of the liquid 150 during the injection molding process flows from within the molding recess 115, through the plurality of apertures 131, through the plurality of passage ways 132, and through at least one of the main vent branches 134 to the exterior 136 of the second mold component 120. While the biomimetic conformal venting passageway 130 schematically depicted in FIG. 6 is in the form of bone material, it should be understood that other biomimetic shapes/forms can be used as a biomimetic conformal venting passageway as discussed in greater detail below. It should also be understood that the biomimetic conformal venting passageway 130, and other biomimetic conformal venting passageways disclosed herein, reduce and/or eliminate the rough surface portion 228 such that a desired surface finish (e.g., a class A surface finish) is provided.

Figure 7:
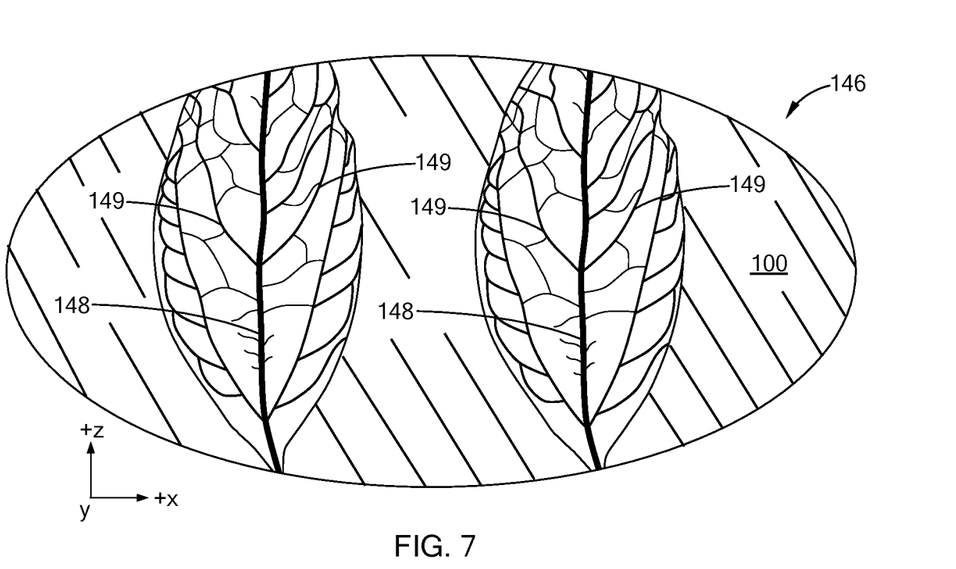
FIG. 7 is another biomimetic conformal venting passageway according to the teachings of the present disclosure.

While the biomimetic conformal venting passageway 110 depicted in FIGS. 4 and 5 is in the form of a spider web, and FIG. 6 depicts the conformal venting passageway 130 in the form of bone material, it should be understood that other biomimetic shapes/forms can be used as a biomimetic conformal venting passageway. For example, FIG. 7 is a vein shaped network 146 comprising primary vein passageways 148 and secondary vein passageways 149 extending from the primary vein passageways 148. Accordingly, such a vein shaped network 146 can be in fluid communication with the first molding surface 102 and/or second molding surface 122 such that gas within the molding recess 115 is vented to the exterior 116 of the first mold component 100 and/or the exterior 136 of the second molding component 120 during injection molding of the part 20.

Figure 8:
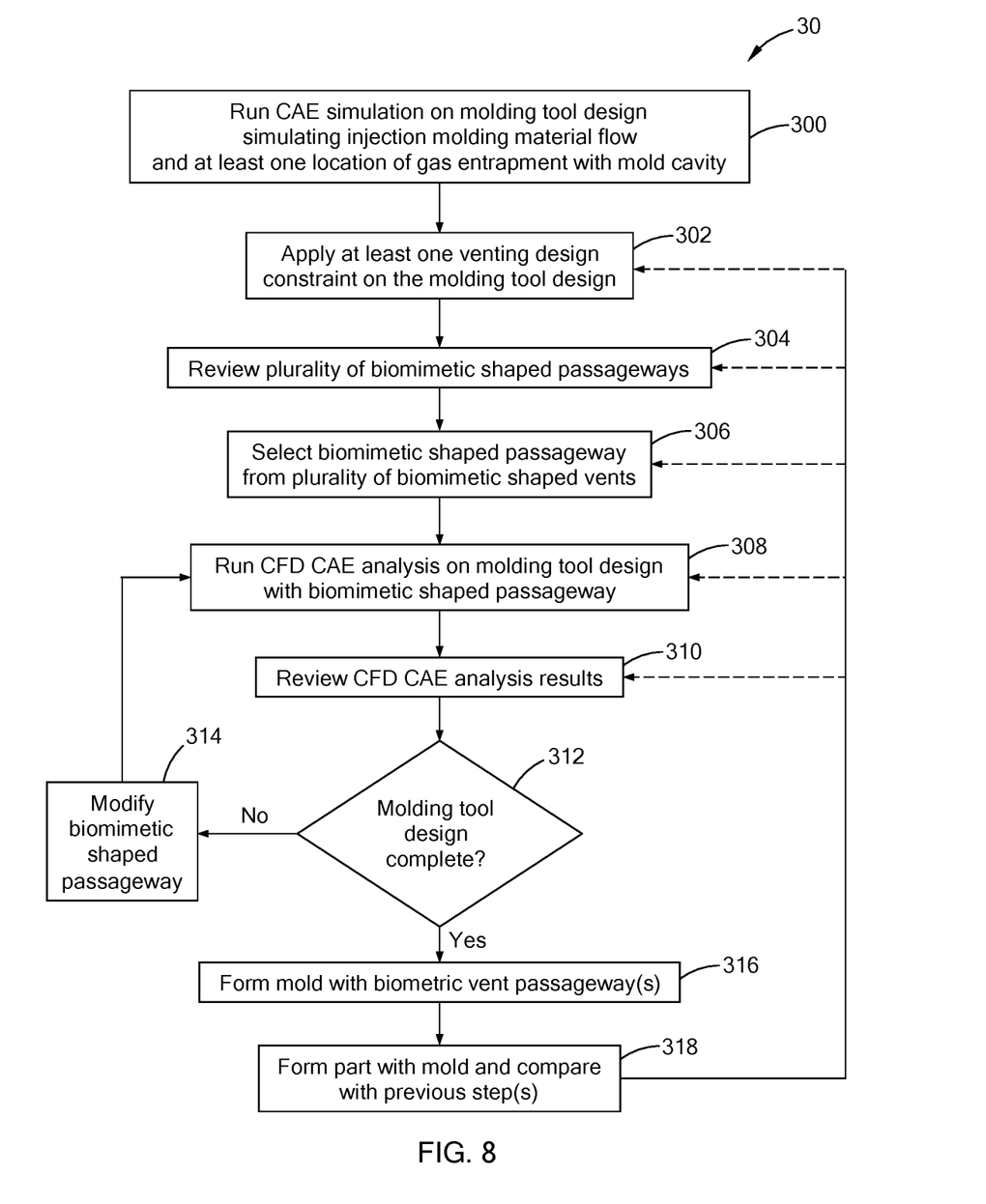
FIG. 8 is a flow chart for a method of forming a molding tool with a biomimetic conformal venting passageway according to the teachings of the present disclosure.

Referring now to FIG. 8, a method 30 for forming a mold with one or more biometric vent passageways is shown. The method 30 includes running (executing or performing) a computer aided engineering (CAE) analysis on a molding tool design at step 300. In some aspects of the present disclosure, the CAE analysis includes simulating or predicting the flow of liquid (e.g., injection molding liquid material) through the molding tool design (i.e., a molding tool per the molding tool design) and the formation of at least one gas entrapment location within a mold cavity. Based on the location of the at least one gas entrapment location, at least one venting design constraint is applied to the molding tool design at step 302. Non-limiting examples of venting design constraints include a minimum diameter of a conformal vent passageway, a maximum diameter of a conformal vent passageway, a minimum length of a conformal vent passageway, a maximum length of a conformal vent passageway, an aspect ratio of a conformal vent passageway, a surface profile of a conformal vent passageway, a polygonal cross-section shape of a conformal vent passageway, an arcuate cross-section shape of a conformal vent passageway, a surface area of a conformal vent passageway to be in fluid communication with a molding surface, and the like. The method 30 includes reviewing a plurality of biomimetic shaped passageways at step 304 and selecting at least one of the plurality of biomimetic shaped passageways at step 306. Non-limiting examples of biomimetic shaped passageways include spider-web shaped passageways in the form of a hexagonal shaped vent passageway, a hexagonal shaped vent network passageway, an octagonal shaped vent passageway, an octagonal shaped vent network passageway, and the like. Other non-limiting examples of biomimetic shaped passageways include worm-hole shaped passageways in the form of a conical shaped vent and a conical shaped vent network passageway, bone-matrix shaped passageways in the form of a lattice shaped vent network, leaf-vein shaped network passageways, and the like. It should be understood that such biomimetic shaped passageways take advantage of shapes, passages, etc., developed or created in nature for efficient flow of a fluid from one location to another location. Also, the selected biomimetic shaped passageways can be a function of a molding resin used to injection mold a part, a material used to form a molding tool, and a gate/runner strategy for a molding tool.

Still referring to FIG. 8, the method 30 includes running a computational fluid dynamic (CFD) CAE analysis on the molding tool design with the selected biomimetic shaped passageway at step 308. In some aspects of the present disclosure, the CFD CAE analysis simulates or predicts the flow of gas from within the mold cavity through the selected biomimetic shaped passageway to an exterior of the molding tool design. The results of the CFD CAE analysis are reviewed at step 310 and whether or not the molding tool design is complete is determined at step 312. If the molding tool design is not complete, the method 30 includes modifying the selected biomimetic shaped passageway at step 314 and returning to step 308 and running another CFD CAE analysis on the molding tool design with the modified biomimetic shaped passageway. Then the method proceeds to step 312 where the results of the revised CFD CAE analysis is reviewed and compared to the previously run CFD CAE analysis. It should be understood that such a cycle, i.e., executing steps 308, 310, 312, 314, 308, etc., can be performed a plurality of times until a desired gas flow characteristic is achieved, until improvement in a gas flow characteristic is no longer achieved by modifying the biomimetic shaped passageway at step 314, until a certain number of CFD CAE analyses have been completed, and the like. After the molding tool design has been determined to be complete at step 312 (e.g., a final biomimetic shaped passageway is determined), the method 30 proceeds to step 316 where a molding tool(s) with a biomimetic shaped passageway is formed. In some aspects of the present disclosure, the method 30 further includes molding a part with the formed molding tool and comparing the molded part with at least one of the previous step results in the method 30 at step 318. That is, step 318 includes forming an injection molded part with the formed molding tool and comparing the surface and/or features of the injection molded part with: the applied at least one venting design constraint in step 302; the review of the plurality of biomimetic shaped passageways in step 304; the selected biomimetic shaped passageway in step 306; the CFD CAE analysis in step 308; the review of the CFD CAE analysis results in step 310; and/or whether or not the molding tool design is complete in step 312. It should be understood that after comparing the molded part with at least one of the previous step results in the method 30, additional modifications of the molding tool design, including modifications of the location, design and/or shape of the biomimetic shaped passageway, can be performed and included in the method 30.

In some aspects of the present disclosure, the biomimetic shaped passageway comprises a final shape determined from a plurality of CFD CAE analyses as described above. Also, in some aspects of the present disclosure, the molding tool(s) is formed using additive manufacturing (e.g., 3D printing). Particularly, traditional molding tool manufacturing techniques such as machining, milling, drilling, grinding and the like are not suitable for forming biomimetic shaped passageways described above since such traditional manufacturing techniques require removal of material via line of sight (linear) from an exit point of the molding tool to an initial starting point of the passageway. That is, forming bends, turns, etc., in a passageway within a molding tool is difficult if not impossible using traditional manufacturing techniques. However, additive manufacturing techniques such as selective laser sintering (SLS), electron beam additive manufacturing (EBAM), fused deposition modeling (FDM), fused filament fabrication (FFM), directed energy deposition (DED), stereolithography (SLA), vat polymerization, multi-jet fusion (MJF), and the like, are well suited for manufacturing such biomimetic shaped passageways since such techniques form shapes by adding material layer by layer where it is desired and leaving spaces void of material (layer by layer) where a passage way is desired.

The molding tools can be formed from any known material used to from injection molding tools. Non-limiting examples of molding tool materials include, steels, nickel-base alloys, cobalt-base alloys, ceramics, and the like. Also, the injection molded parts can be formed from any known material used for injection molding. Non-limiting examples of injection molding materials include polypropylene (PP), high density polyethylene (HDPE), low density polyethylene (LDPE), polyurethane (PU), polyamide (PA), polycarbonate (PC), polystyrene (PS), high impact polystyrene (HIPS), polybutylene terephthalate (PBT), polyetherimide (PEI), polyphenylene sulfide (PPS), polyethylene terephthalate (PET), acrylonitrile butadiene styrene (ABS), and combinations thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a molding tool comprising:
   performing a computer aided engineering (CAE) analysis on a molding tool design of a molding tool;
   applying at least one venting design constraint to the molding tool design as a function of at least one gas entrapment location within a molding recess of the molding tool design;
   selecting a biomimetic shaped passageway from a plurality of biomimetic shaped passageways;
   performing a computational fluid dynamic (CFD) CAE analysis of the molding tool design with the selected biomimetic shaped passageway, wherein the CFD CAE analysis predicts flow of gas from the at least one gas entrapment location through the selected biomimetic shaped passageway; and
   forming the molding tool with the selected biomimetic shaped passageway.

2. The method according to claim 1, wherein the CAE analysis predicts flow of injection molded material within the molding tool design and a location of at least one gas entrapment within the molding recess during injection molding of the part.

3. The method according to claim 1 further comprising determining at least one element of the molding tool requiring venting.

4. The method according to claim 3, wherein the at least one element of the molding tool requiring venting comprises at least one of a core/cavity parting line, a slide, a lifter, and a pin.

5. The method according to claim 1, wherein the at least one venting design constraint comprises at least one of a minimum vent diameter, a maximum vent diameter, a minimum vent length, a maximum vent length, and a vent surface profile.

6. The method according to claim 1, wherein the prediction of the flow of injection molded material within the molding tool design and the at least one gas entrapment location within the molding recess is a function of at least one of a molding resin used to injection mold the part, a material used to form the molding tool, and a gate/runner strategy for the molding tool.

7. The method according to claim 6, wherein the CAE analysis predicts at least one location for a vent to be positioned in the molding tool.

8. The method according to claim 1, wherein the selected biomimetic shaped passageway comprises at least one of a hexagonal shaped vent network, an octagonal shaped vent network, a conical shaped vent network, a lattice shaped vent network, and a vein shaped vent network.

9. The method according to claim 1 further comprising modifying the selected biomimetic shaped passageway and performing another CFD CAE analysis of the molding tool design with the modified biomimetic shaped passageway and reviewing the prediction of gas flow from the at least one gas entrapment location through the modified biomimetic shaped passageway.

10. The method according to claim 9 further comprising performing a plurality of modifications to the selected biomimetic shaped passageway and performing another CFD CAE analysis of the molding tool design with the modified biomimetic shaped passageway after each modification until a final biomimetic shaped passageway is determined.

11. The method according to claim 1, wherein the molding tool with the selected biomimetic shaped passageway is formed by additive manufacturing.

12. The method according to claim 1 further comprising injection molding a part in the molding tool with the selected biomimetic shaped passageway.

13. The method according to claim 12 further comprising correlating the CFD CAE analysis predicting flow of gas from the at least one gas entrapment location with at least one of a surface appearance of the injection molded part and a dimension of the injection molded part.

14. The method according to claim 1, wherein the selected biomimetic shaped passageway is in fluid communication with a mold cavity of the molding tool via a plurality of openings.

15. The method according to claim 14, wherein the plurality of openings comprise an average diameter between 0.003 inches and 0.005 inches.

16. A method of forming a molding tool comprising:
providing a design of a part to be injection molded formed with a molding tool;
determining at least one element of the molding tool requiring venting during injection molding of the part;
performing a computer aided engineering (CAE) analysis on a molding tool design of the molding tool, wherein the CAE analysis predicts flow of injection molded material within the molding tool design, and a position of at least one gas entrapment location within a molding recess of the molding tool design during injection molding of the part;
applying at least one venting design constraint to the molding tool design as a function of the at least one gas entrapment location within a molding recess of the molding tool design;
analyzing a plurality of biomimetic shaped passageways for venting gas from the at least one gas entrapment location;
selecting a biomimetic shaped passageway from the plurality of biomimetic shaped passageways;
performing computational fluid dynamic (CFD) CAE analysis of the molding tool design with the selected biomimetic shaped passageway, wherein the CFD CAE analysis predicts flow of gas from the at least one gas entrapment location through the selected biomimetic shaped passageway; and
forming the molding tool with the selected biomimetic shaped passageway.

17. The method according to claim 16, wherein the at least one gas entrapment location is proximate to at least one of a core/cavity parting line, a slide, a lifter, and a pin.

18. The method according to claim 17, wherein the selected biomimetic shaped passageway comprises at least one of a hexagonal shaped vent network, an octagonal shaped vent network, a conical shaped vent network, a lattice shaped vent network, and a vein shaped vent network.

19. A method of forming a molding tool comprising the step of:
a) providing a design of a part to be injection molded using a molding tool;
b) determining at least one element of the molding tool requiring venting during injection molding of the part;
c) performing a computer aided engineering (CAE) analysis on a molding tool design of the molding tool, wherein the CAE analysis predicts flow of injection molded material within the molding tool design and a position of at least one gas entrapment location within a molding recess of the molding tool design during injection molding of the part;
d) applying at least one venting design constraint to the molding tool design as a function of at least one gas entrapment location within a molding recess of the molding tool design;
e) analyzing a plurality of biomimetic shaped passageways for venting gas from the at least one gas entrapment location;
f) selecting a biomimetic shaped passageway from the plurality of biomimetic shaped passageways;
g) performing a computational fluid dynamic (CFD) CAE analysis of the molding tool design with the selected biomimetic shaped passageway, wherein the CFD CAE analysis predicts flow of gas from the at least one gas entrapment location through the selected biomimetic shaped passageway;
h) reviewing the CFD CAE analysis and modifying the selected biomimetic shaped passageway;
i) repeating steps g) and h) until a final molding tool design is determined; and j) using the final molding tool design to additive manufacture at least a portion of the molding tool.

20. The method according to claim 19 further comprising injection molding a part in the molding tool and correlating the CFD CAE analyses predicting flow of gas from the at least one gas entrapment location with at least one of a surface appearance of the injection molded part and a dimension of the injection molded part.

\* \* \* \* \*